United States Patent [19]

Kimura

[11] 4,367,494
[45] Jan. 4, 1983

[54] VIDEO RECORDER-PLAYER AND HORIZONTAL SYNC SEPARATOR THEREFORE

[75] Inventor: Kenji Kimura, Tachikawa, Japan

[73] Assignee: Olympus Optical Company Limited, Tokyo, Japan

[21] Appl. No.: 151,101

[22] Filed: May 19, 1980

[30] Foreign Application Priority Data

May 21, 1979 [JP] Japan .................................. 54-62404

[51] Int. Cl.³ ....................... H04N 5/79; H04N 5/795
[52] U.S. Cl. ..................................... 360/22; 360/32; 360/36.1; 358/337
[58] Field of Search ................................... 360/22–23, 360/26–27, 32–33, 36; 358/127

[56] References Cited

U.S. PATENT DOCUMENTS

| Re. 25,809 | 6/1965 | Johnson | 360/26 |
| 2,907,819 | 10/1959 | Wetzel | 360/22 |
| 3,327,299 | 6/1967 | Johnson | 360/26 |
| 3,746,781 | 7/1973 | Nakayama | 360/22 |
| 3,758,710 | 4/1973 | Crosno | 360/36 |
| 4,048,658 | 9/1977 | Nakagawa | 360/22 |

Primary Examiner—Raymond P. Cardillo, Jr.
Attorney, Agent, or Firm—Toren, McGeady & Stanger

[57] ABSTRACT

In the disclosed recorder-player, an image signal is converted to multi-channel signals and a horizontal synchronizing signal is obtained therefrom by separating a synchronizing signal from the multi-channel signals to operate a flywheel oscillator, and by a loop in each channel in which a time base corrector in each channel operates a sync separator and in response to a coincident output from the sync separator in each channel and an output from the flywheel oscillator.

2 Claims, 9 Drawing Figures

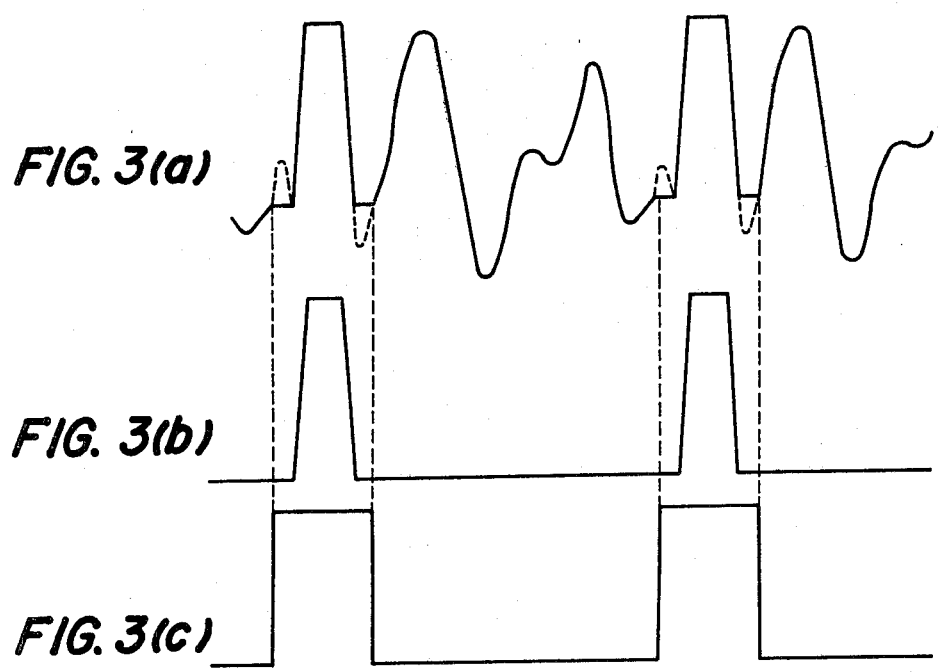

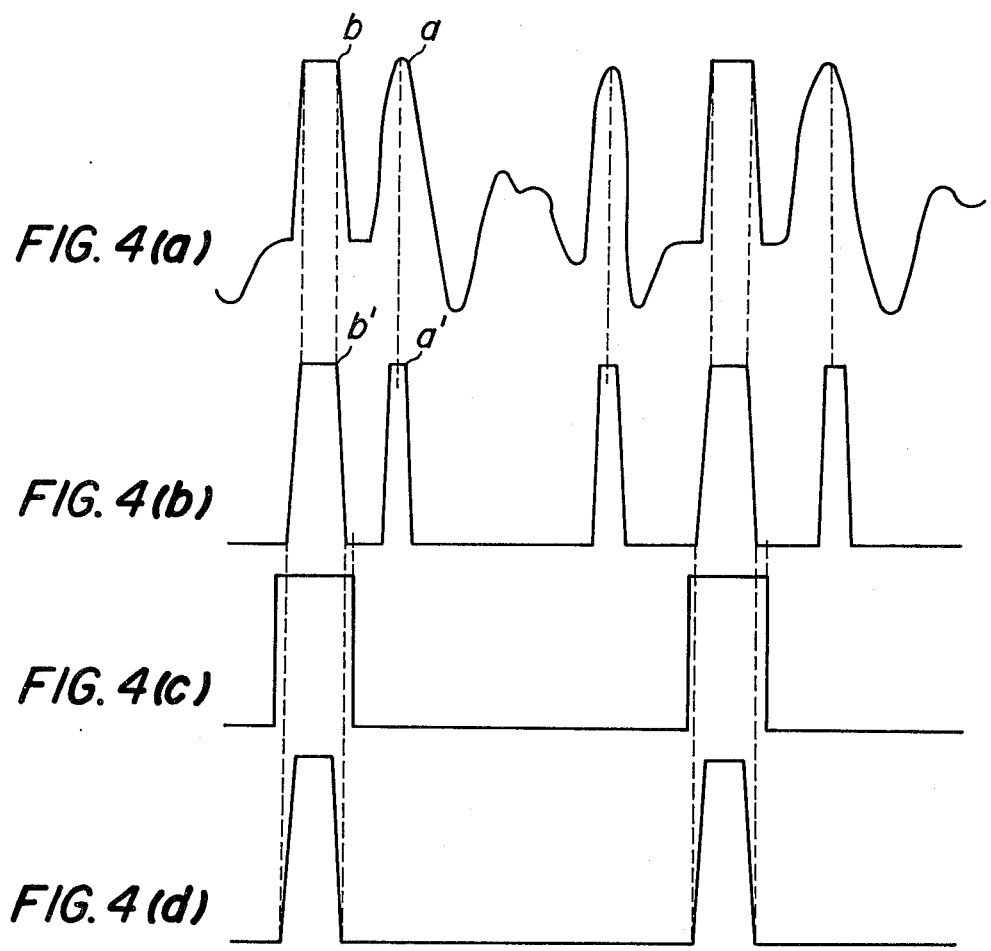

VIDEO RECORDER-PLAYER AND HORIZONTAL SYNC SEPARATOR THEREFORE

BACKGROUND OF THE INVENTION

This invention relates to video-recorders and players and a system for separating horizontal synchronizing signals during playback of the players. The invention relates particularly to a system in which an image signal is subject to Hadamard conversion or time division conversion into multi-channel signals which are subject to band limitations and which are recorded and played back with a plurality of fixed magnetic heads.

Recording and playback apparatuses using fixed-type multi-channel magnetic heads cause jitter and drift in the playback signals and cause time base fluctuation between channels due to positioning errors of the heads or uneven running of the tape.

Often, to solve this problem, a time base correction is inserted into a horizontal blanking phase portion of a converted or multi-channel signal during recording. The correction signal is separated from the averted signal during playback and the thus separated signal is used as a signal to indicate time base fluctuation and thereby to correct the time base. In this case, to achieve time axis correction signals, horizontal synchronizing signals in the image signals are commonly used as is. Because the synchronizing signal is used as is, it serves as a time base correction signal.

For separating the time base correction signal from a converted multi-channel signal during playback, efforts have been made to detect the difference in level between a converted multi-channel signal and a synchronizing signal. That is, hitherto, when a synchronizing signal and a converted multi-channel signal combined as shown as shown in FIG. 1, and the maximum level $L_1$ of a converted signal a and the level $L_2$ of a synchronizing signal b were made sufficiently large, a slice level $L_0$ could be used as the basis for discriminating between levels and for separating the synchronizing signal b.

However, in such a technique, a signal to noise ratio of the converted signal may be such that the converted signal must be made substantially smaller than the synchronizing signal to avoid the effect of noise.

SUMMARY OF THE INVENTION

It is an object of the present invention to eliminate the above described disadvantages of the conventional synchronizing signal separation system.

It is another object of the present invention to provide a synchronizing signal separation system for making the level of a converted signal almost equal to the level of a synchronizing signal and for positively separating the synchronizing signal at the time of reproduction.

According to the present invention a system for separating a synchronizing signal for use in a recording and reproducing apparatus by converting an image signal to conversion signals in a plurality of channels and recording and reproducing the converted signals, comprises means for separating a synchronizing signal mixed in the converted signal to correct a time base of the converted signal, and means for obtaining a synchronizing signal for correcting the time base from a coincident output of a synchronizing signal obtained from the output side of a time base corrector and a window pulse obtained from an output of a flywheel oscillator operated by the synchronizing signal in the converted signal.

The flywheel oscillator generates a flywheel output from a coincident output of a synchronizing signal in the converted signal and a window pulse obtained from an output of the flywheel oscillator.

BRIEF DESCRIPTION OF THE DRAWING

FIGS. 3a to 3c are waveform diagrams for explaining operations of the system shown in FIG. 2.

FIGS. 4a to 4d are waveform diagrams for explaining operations of the system in FIG. 2.

DESCRIPTION OF THE PREFERRED EMBODIMENT

Figure 1:
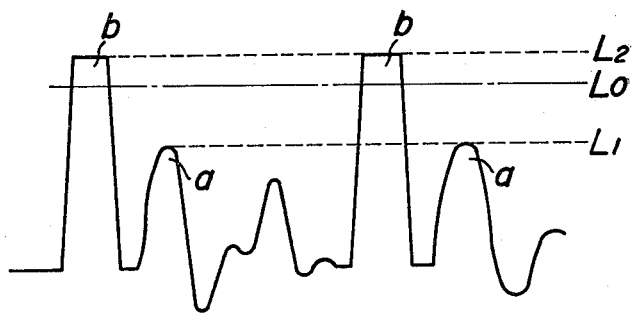
FIG. 1 is a waveform diagram for explaining an operation of a conventional synchronizing signal separation system.
Figure 2:
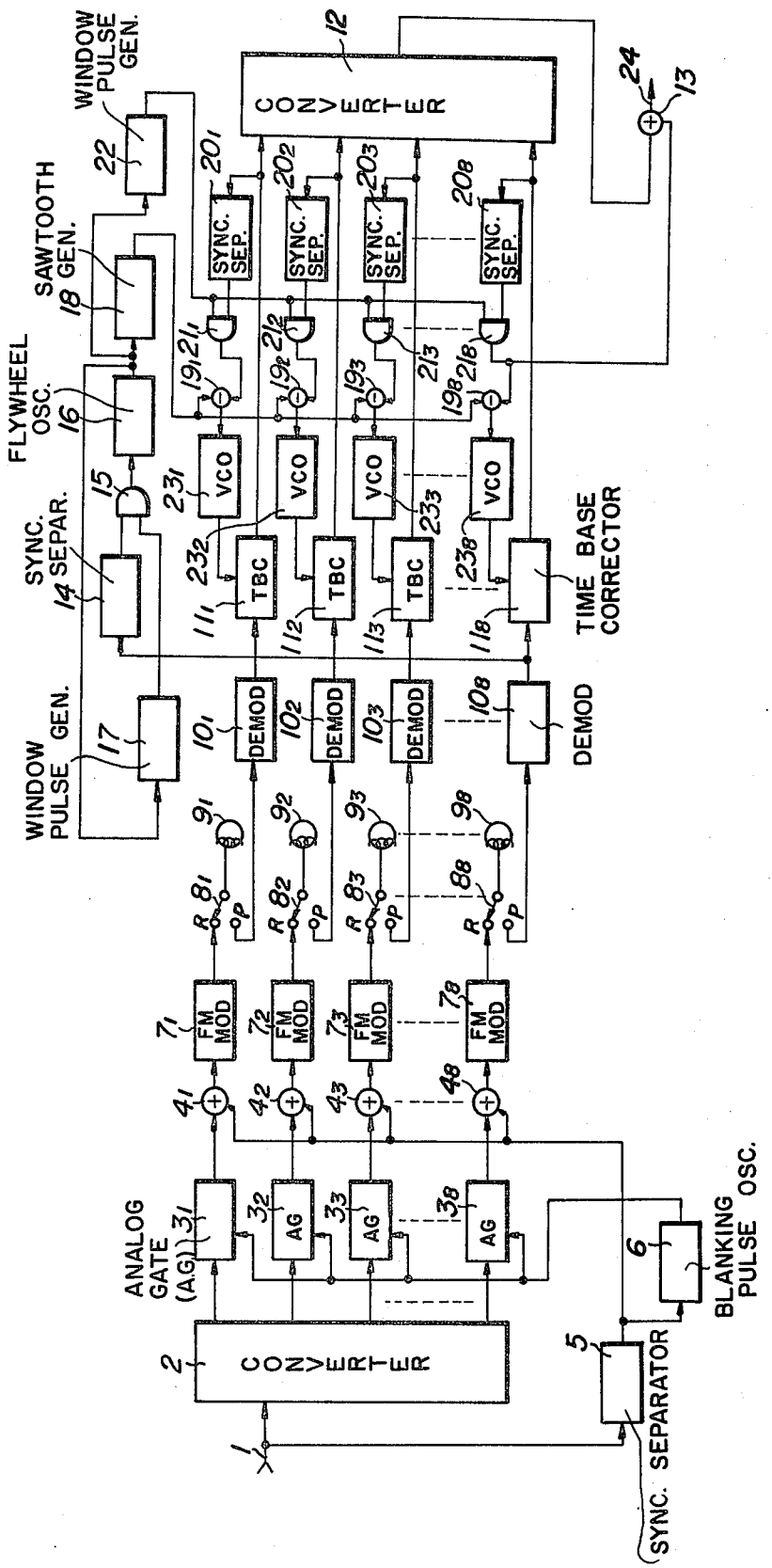
FIG. 2 is a block diagram showing one embodiment of a construction of a system for separating synchronizing signal according to the present invention.

In FIG. 2, an input line 1 receives an input image signal, and is connected to a converter, for example, an Hadamard converter 2. The converter 2 is composed of a resistance matrix and the like for generating Hadamard converted signals for multichannels (8 channels in the illustrated embodiment).

An output side of the converter 2 are connected to mixers $4_1, 4_2 \ldots 4_8$ through analog gates $3_1, 3_2 \ldots 3_8$. The mixers $4_1, 4_2 \ldots 4_8$ are also connected to a horizontal synchronizing separator 5.

The synchronizing separator 5 is connected to the input line 1 at its input for separating a horizontal synchronizing signal contained in an input image signal and generating the horizontal synchronizing signal as a synchronizing signal for correcting a time base.

The synchronizing separator 5 is also connected to a blanking pulse oscillator 6, and the oscillator 6 is connected to the analog gates $3_1, 3_2 \ldots 3_8$.

The output sides of the mixers $4_1, 4_2 \ldots 4_8$ are connected to modulators, for example FM modulators $7_1, 7_2 \ldots 7_8$, and these FM modulators $7_1, 7_2 \ldots 7_8$ are connected to recording and reproducing magnetic heads $9_1, 9_2 \ldots 9_8$ through a contact R-P on the recording side of change-over switches $8_1, 8_2 \ldots 8_8$.

The magnetic heads $9_1, 9_2 \ldots 9_8$ are connected to demodulators $10_1, 10_2 \ldots 10_8$ through a contact P-S on the reproduction side of the switches $8_1, 8_2 \ldots 8_8$, and these demodulators $10_1, 10_2 \ldots 10_8$ are connected to time base correctors $11_1, 11_2 \ldots 11_8$. The time base correctors $11_1, 11_2 \ldots 11_8$ absorb and remove a jitter-drift component contained in the reproduced and converted signal, and in the illustrated embodiment, a delay time, i.e., output phase is changed by a transfer lock frequency using CCD (charged coupled device).

The time base correctors $11_1, 11_2 \ldots 11_8$ are connected to reverse-converters, for example, Hadamard reverse-converter 12. The Hadamard reverse-converter 12 is composed of resistance matrix and the like for restoring the original image signal from the output of the time base correctors $11_1, 11_2 \ldots 11_8$ and supplying the signal to the mixer 13.

An optional output terminal (output terminal of the demodulator $10_8$ in the embodiment) in the demodulators $10_1, 10_2 \ldots 10_8$ is connected to a synchronizing separator 14. The synchronizing separetor 14 only separates a synchronizing signal contained in the reproduced and converted signal from the demodulator $10_8$.

The synchronizing separator 14 is connected to one input terminal of an AND gate 15, and the output terminal of the AND gate 15 is connected to a flywheel oscillator 16.

The output terminal of the oscillator 16 is connected to the other input terminal of the AND gate 15 through a window pulse generator 17. The flywheel oscillator 16 is connected to a saw-tooth wave generator 18, and the saw-tooth wave generator 18 generates an output as a reference signal for time base correction. The saw-tooth wave generator 18 is connected at its output side to one input terminal of phase comparators $19_1$, $19_2$ ... $19_8$.

The time base correctors $11_1$, $11_2$ ... $11_8$ are also connected to synchronizing separators $20_1$, $20_2$ ... $20_8$. These synchrinizing separators $20_1$, $20_2$ ... $20_8$ separate a synchronizing signal contained in the reproduced and converted signal.

The synchronizing separators $20_1$, $20_2$ ... $20_8$ are connected to one input terminal of AND gates $21_1$, $21_2$ ... $21_8$. These AND gates $21_1$, $21_2$ ... $21_8$ are connected at the other input terminal to the flywheel oscillator 16 through a window pulse generator 22.

Output terminals of the AND gates $21_1$, $21_2$ ... $21_8$ are connected to the other input terminals of the phase comparators $19_1$, $19_2$ ... $19_8$.

The output terminals of the phase comparators $19_1$, $19_2$ ... $19_8$ are connected to the time base correctors $11_1$, $11_2$ ... $11_8$ through voltage controlled oscillators $23_1$, $23_2$ ... $23_8$. The voltage controlled oscillators $23_1$, $23_2$ ... $23_8$ serve to vary an oscillation frequency in accordance with the output of the phase comparators $19_1$, $19_2$ ... $19_8$.

The output terminal of the AND gate $21_8$ among the AND gates $21_1$, $21_2$ ... $21_8$ is connected to the mixer 13 and the mixer 13 is connected to an output line 24 for delivering a reproduced image signal.

In operation, let it be assumed that the switches $8_1$, $8_2$ ... $8_8$ are closed at the contact R-P on the recording side.

In this state, if an image signal is supplied to the input line 1, Hadamard conversion signals in 8 channels are generated from the Hadamard converter 2 and further supplied to the mixers $4_1$, $4_2$ ... $4_8$ through the analog gates $3_1$, $3_2$ ... $3_8$.

On the other hand, the horizontal synchronizing signal contained in the input image signal is separated at the synchronizing separator 5, supplied to the mixers $4_1$, $4_2$ ... $4_8$ as a synchronizing signal and mixed with the converted signal.

In this case, at every output of the synchronizing separator 5 a blanking pulse shown in FIG. 3c is generated from the blanking pulse generator 6, but while the blanking pulse is generated, the analog gates $3_1$, $3_2$ ... $3_8$ are only made non-conductive.

In this manner, the synchronizing signal shown in FIG. 3b is mixed into the converted signal under the state of removing the converted signal generated in the vicinity shown in FIG. 3a (shown by a broken line).

Such converted signal is FM modulated by the FM modulators $7_1$, $7_2$ ... $7_8$, supplied to the magnetic heads $9_1$, $9_2$ ... $9_8$ through the switches $8_1$, $8_2$ ... $8_8$ as an FM carrier and recorded on a magnetic tape or the like (not shown).

The reproduced and converted signal from the magnetic heads $9_1$, $9_2$ ... $9_8$ is supplied to the demodulators $10_1$, $10_2$ ... $10_8$ through the switches $8_1$, $8_2$ ... $8_8$, demodulated therein and supplied to the time base correctors $11_1$, $11_2$ ... $11_8$.

The output of said demodulator $10_8$ is supplied to the synchronizing separator 14. The synchronizing signal only, in the reproduced and converted signal, is delivered through the separator 14 and supplied to the AND gate 15. In this case, the AND gate 15 receives an output of the window pulse generator 17 for inhibiting a mixed signal other than the synchronizing signal. An ANDed output of the AND gate 15 is supplied to the flywheel oscillator 16. The fltwheel oscillator 16 therefore generates a flywheel output having a high reliability without affecting by any influence from the mixed signal in accordance with the synchronizing signal. This output is supplied to the saw-tooth wave generator 18 and a reference signal for time base correction is supplied to each phase comparator $19_1$, $19_2$ ... $19_8$ from the generator 18.

On the other hand, the synchronizing signal in the reproduced and converted signal is only delivered from the output of the time base correctors $11_1$, $11_2$ ... $11_8$ through the synchronizing separators $20_1$, $20_2$ ... $20_8$. Moreover, the outputs of the separators $20_1$, $20_2$ ... $20_8$ are passed through the AND gates $21_1$, $21_2$ ... $21_8$ thereby remove the mixed signal such as converted signal or the like. The condition in this case is explained with reference to FIG. 4. It is assumed that if the output waveform of the demodulators $10_1$, $10_2$ ... $10_8$ is supplied while mixing the synchronizing signal b in the converted signal 2 as shown in FIG. 4a, the outputs of the synchronizing separators $20_1$, $20_2$ ... $20_8$ generate not only the synchronizing signal b' but also the synchronizing signal a' In FIG. 4b. When the synchronizing signal b in FIG. 4a is supplied, the output of the window pulse generator 22 is generated so as to coincide the phase with the center of the synchronizing signal b as shown in FIG. 4c, so that the synchronizing signal only is separated and generated from the AND gates $21_1$, $21_2$ ... $21_8$ as shown in FIG. 4d. It means as shown in FIG. 3 even if the converted signal is made almost equal to the level of the synchronizing signal, the synchronizing signal at the time of reproduction is positively separated.

The output of the AND gates $21_1$, $21_2$ ... $21_8$ is supplied to the phase comparators $19_1$, $19_2$ ... $19_8$. The output in proportion to a phase difference of the reference signal is generated from the comparators $19_1$, $19_2$ ... $19_8$, and the output is supplied to the voltage control oscillators $23_1$, $23_2$ ... $23_n$. Thereafter, the output phase of the time base correctors $11_1$, $11_2$ ... $11_8$ is controlled by an oscillation frequency of the voltage controlled oscillators $23_1$, $23_2$ ... $23_8$ in accordance with the output of the comparators $19_1$, $19_2$ ... $19_8$ in this case, thereby removing a jitter component contained in the output phase of the time base correctors $11_1$, $11_2$ ... $11_8$. In this case, a system consisting of the time base correctors $11_1$, $11_2$ ... $11_8$, the synchronizing separators $20_1$, $20_2$ ... $20_8$, the AND gates $21_1$, $21_2$ ... $21_8$, the phase comparators $19_1$, $19_2$ ... $19_8$, and the voltage controlled oscillators $23_1$, $23_2$ ... $23_n$ form negative feedback loops, so that each output phase of the time base correctors $11_1$, $11_2$ ... $11_8$ is controlled to coincide with the central phase of the saw-tooth wave generator 18.

The reproduced and converted signal which jitter-drift component is absorbed by the time base correctors $11_1$, $11_2$ ... $11_8$ is supplied to the Hadamard reverse-converter 12, converted into the original image signal, mixed with the synchronizing signal in the mixer 13 and generated as a reproduced image signal to the output line 24.

As a result, even if the converted signal is made almost equal to the level of the synchronizing signal, the synchronizing signal can positively be separated at the time of reproduction, so that the S/N ratio of the converted signal can be improved by a large margin, and a very good reproduced image signal can be obtained.

The present invention is not limited to the above embodiment but can be modified within the range without departing from the essential feature. For example, the case of eight channels is explained in the above, but the invention can be carried out in any channels. Moreover, the above embodiment is of an Hadamard conversion system, but this invention can be applied to a time division system.

As described above, the invention can provide a synchronizing signal separation system for making the converted signal almost equal to the level of the synchronizing signal and positively separating the synchronizing signal at the time of reproduction.

What is claimed is:

1. A system for separating a synchronizing signal for use in a recording and reproducing apparatus comprising: means for converting an image signal to conversion signals along a plurality of channels, means for recording and reproducing the converted signals, synchronizing separator means for separating a synchronizing signal mixed in the converted signal to correct a time base of the converted signal, a time base corrector in each channel, a flywheel oscillator responsive to the synchronizing separator means, means in each channel for obtaining a synchronizing signal for correcting the time base from a coincident output of a synchronizing signal obtained from the output of the time base corrector in that channel and a window pulse obtained from an output of the flywheel oscillator operated by the synchronizing signal in the converted signal.

2. A synchronizing signal separation system as claimed in claim 1, wherein the flywheel oscillator generates a flywheel output from a coincident output of a synchronizing signal in the converted signal and a window pulse of a window pulse generator responsive to an output of the flywheel oscillator.

* * * * *